Patented Aug. 11, 1936

2,050,706

UNITED STATES PATENT OFFICE 2,050,706

BONDING RUBBER TO SURFACES

Bernard William Deacon Lacey, Ward End, Birmingham, and William Vernon Clarke, Wylde Green, Sutton Coldfield, England, assignors to Dunlop Tire and Rubber Corporation, Buffalo, N. Y., a corporation of New York No Drawing. Application March 9, 1935, Serial No. 10,246. In Great Britain March 16, 1934

5 Claims. (Cl. 91—68)

This invention concerns an improved method for bonding rubber or the like to metal and other surfaces.

More particularly the invention relates to an improved method whereby articles such as those of metal, glass, wood, or hard rubber, having comparatively smooth surfaces may be provided with tenacious coating of rubber or the like.

By the term "rubber or the like" is intended not only articles or sheets or bodies composed entirely of rubber, but also articles or sheets composed partly of rubber and partly of gutta-percha or balata.

By the present invention the production of composite articles is rendered possible which have the property of remaining substantially unaffected by temperatures rising to or beyond 80° C. (176° F.) and in point of fact metal-rubber products bonded in the manner to be described, possess a great advantage over thermoplastic adhesives known heretofore, in that heat up to the rotting point of the rubber itself does not weaken the bond produced by our method, whereas the bond produced by adhesives of a thermoplastic nature is rendered valueless at the above temperatures.

The preparation of the surface of the article to be coated is of a comparatively simple nature and the type of rubber employed need only conform to the requirements of the final product.

Among various purposes and objects to which the process may be usefully directed, are the coating of metal sheets such as floorboards and motor vehicle running boards with rubber, the unification of part rubber and part metal bodies such as tire valves, and the internal coating of pipes with abrasion-resisting linings, particularly where it is important that the adhesion of the lining or external coating shall remain unaffected by heat.

According to this invention the method of bonding material composed wholly or partly of rubber or the like to a rigid surface, is characterized by preparing a bonding surface upon the said material by the application of sulphuric acid.

It is found that an adequate bond is readily obtainable by the pre-treatment of the rubber-containing surface with sulphuric acid alone, provided that the rubber-containing surface is free from wax, oil, grease, or any film of like nature which would prevent wetting with the acid.

Should such a film be present, however, the bonding surface may be prepared by treating the surface of the rubber-containing material by spraying, brushing, or dipping, with a saturated solution of chromium tri-oxide in sulphuric acid.

The sulphuric acid is of a concentration of 96 parts by volume of pure acid to 4 of water to which as stated above, we may add sufficient chromium tri-oxide to saturate the solution.

In one example a bonding surface is prepared by sulphuric acid and chromium tri-oxide treatment of a compound of the following composition, by weight:—

| | |
|---|---|
| Rubber | 60 |
| Sulphur | 1.5 |
| Mercaptobenzthiazole | 0.5 |
| Stearic acid | 2.0 |
| Softener | 3.0 |
| Zinc oxide | 3.0 |
| Gas black | 28.0 |

The surface of the material to be bonded is then treated for half a minute with the solution and is then washed directly in a jet of water to remove all traces of acid and is subsequently immersed in running water for about 15 minutes.

Due care must be taken not to apply the acid solution to any part of the rubber-containing material which will be pressed into contact with the metal or other surface of the mould or press.

Where only one bonding surface is to be prepared on a sheet of rubber, the other surface may be protected temporarily by the application under pressure of a sheet of tracing cloth or by coating the surface with wax.

This temporary protection permits the sheet to be dipped into the acid solution and must be removed before moulding.

As a further alternative, the acid solution may be brushed on to the material preferably with a glass brush.

The bonding surface so prepared is carefully dried after washing and when dry the bonding surface should feel particularly smooth and devoid of the characteristic drag of vulcanized or unvulcanized rubber.

It is usual with some compounds for the bonding surface immediately after the acid treatment to appear finely wrinkled, and this appearance persists after drying.

Before applying the treated material to a metal or other rigid surface, the latter is freed from foreign matter such as grease, loose scale, or rust, preferably by methods which avoid the formation of a rough surface.

No further treatment is necessary and the cleaned metal or other rigid sheet or body is then placed in a mould or between heated platens together with the rubber material to be secured to its surface.

The mould should be well filled to avoid excessive movement during cure and the pressure during cure should be sufficient to ensure intimate contact between the parts to be bonded.

Such pressure is preferably obtained by hydraulic or similar fluid pressure means rather than by lapping windings about the parts.

The period required to bond the surfaces together in the case of pre-vulcanized rubber is of the order of 10 minutes at 148° C. (298° F.), and may be exceeded without prejudice to the bond.

Where the rubber is initially unvulcanized, however, at least 10 minutes at 298° F. is required to effect bonding and such further heat treatment at higher or lower temperatures as is required to complete vulcanization.

In the case of both unvulcanized and vulcanized rubber, it is desirable as a precautionary measure that no great strains should be imposed upon the bond until it has cooled down to normal temperature.

Subsequently the bond may be exposed to increase of temperature without weakening the bond up to a temperature at which the rubber begins to soften or burn.

Having now particularly described our said invention we claim:—

1. A method of bonding rubber containing materials to a rigid surface which comprises treating a surface of said rubber containing material with concentrated sulphuric acid for one half a minute, immediately removing the sulphuric acid from said surface and pressing said treated surface of said rubber containing material directly against said rigid surface to which it is to be bonded.

2. A method of bonding a rubber containing material to a rigid surface which comprises treating a surface of said rubber containing material with concentrated sulphuric acid for a fraction of a minute, immediately washing said acid from said surface and pressing said surface directly against said rigid surface.

3. The process of claim 2, in which said sulphuric acid is admixed with chromium tri-oxide.

4. The process of claim 2, in which said rubber containing material is pressed against said rigid surface for a minimum period of ten minutes at 148° C.

5. A method of bonding rubber-containing material to a rigid surface which comprises treating a surface of rubber-containing material with concentrated sulphuric acid admixed with chromium trioxide for a fraction of a minute to remove grease and adhering matter without roughening said surface, washing said acid from said surface, and pressing said surface directly against said rigid surface.

BERNARD WILLIAM DEACON LACEY.
WILLIAM VERNON CLARKE.